United States Patent

[11] 3,586,344

| [72] | Inventor | Raymond F. Nixon<br>Bloomfield Hills, Mich. |
|---|---|---|
| [21] | Appl. No. | 736,040 |
| [22] | Filed | June 11, 1968 |
| [45] | Patented | June 22, 1971 |
| [73] | Assignee | Omark-Winslow Aerospace Tool Co.<br>Arcadia, Calif. |

[54] QUICK-CHANGE TOOL ASSEMBLY
6 Claims, 2 Drawing Figs.

[52] U.S. Cl.................................................. 279/83,
279/97
[51] Int. Cl............................................... B23b 31/10
[50] Field of Search........................................ 279/83, 86;
64/4, 31; 279/97, 16

[56] References Cited
UNITED STATES PATENTS

| 2,039,855 | 5/1936 | Stone | 279/83 X |
| 2,128,116 | 8/1938 | Boone | 279/83 |
| 2,974,965 | 3/1961 | Welles | 279/83 |
| 3,091,474 | 5/1963 | Boutros | 279/86 X |
| 2,826,053 | 3/1958 | Munn | 279/16 X |

FOREIGN PATENTS

| 1,106,145 | 1961 | Germany | 279/86 |

*Primary Examiner*—Andrew R. Juhasz
*Assistant Examiner*—Donald D. Evenson
*Attorney*—Forrest J. Lilly ABSTRACT: In a preferred form, the subject invention relates to assemblies adapted to enable repetitive positioning of cutting tools, and in a specific form comprises a driver or holder adapted to be carried by a machine tool spindle and having a bore therein arranged to receive a tool adapter so that a cutting surface carried thereon can be positioned in only one radial position relative to the spindle. The driver or holder includes a pin extending transversely of the bore which is slightly offset from the longitudinal axis of the bore. The pin is adapted to mate with a complementary shaped depression extending transversely of the adapter on the rear portion thereof and which is also offset from the longitudinal axis thereof a similar amount to that of the pin so that the two can be mated only when the adapter and cutting surface carried thereby is situated in one radial position.

3,586,344

INVENTOR.
Raymond F. Nixon
BY
Barnard, McGlynn & Reising
ATTORNEYS

QUICK-CHANGE TOOL ASSEMBLY

The present invention relates to machine tools and, more particularly, to a two-piece quick-change tool assembly.

It is desirable in the machine-tool art to be able to establish a machine setup for progressive machining operations. More particularly, this involves having a tool or cutting surface make a desired cut, withdraw that tool from a driver, insert another tool into the driver to perform another operation, withdraw the second tool from the driver and then reposition the tool originally used into the exact same radial position that it formerly occupied to duplicate the first cut. This is termed repetitive positioning. This necessarily requires that the tool, or an adapter for the tool, be precisely radially locatable relative to the bore in which it is held. In addition, it is desirable that the aforementioned tool changes be accomplished very quickly without affecting the accuracy of the tool positions. It should be understood that tool, as herein sued, means the actual cutting surface, whether integral with or attached to a tool shank or body.

Repetitive positioning presents a problem because the true axes, as opposed to rotational axes, of machine spindles, drivers and adapters are not precisely coaxial when formed into an assembly. This is due to fine dimensional variances that inevitably creep into these parts when constructed. The true axis of an element as herein used is a line passing therethrough that is equidistant from extremities thereof and normally defines the longitudinal axis of the element. The rotational axis of an element is distinguished from the true axis in that the rotational axis is a line passing through the element that is coaxial with the rotational axis of the prime driver of that element. In the present case, the machine spindle is the prime driver, and all elements, drivers or adapters, rotating therewith have a rotational axis common to the rotational axis of the machine spindle. It is understood that herein a driver is an element that is nonrotatably carried by a machine spindle and can also be termed a holder while an adapter is an element that is removably connected to the driver and adapts that driver to carry different types of tools.

When machining an aperture, the arc transcribed by the cutting surface of a tool determines the dimension of an aperture bored or a cut made, and the rotational axis of the spindle determines the axis of the aperture bored and are transcribed by the cutting surface. Assuming a tool adapter is mounted relative to a spindle in such a manner that the true axis of the adapter is angularly offset with respect to the rotational axis of the spindle, a larger arc will be transcribed than would be transcribed if the adapter were rotating on its true axis. If this slightly larger arc is acceptable in the installation, then that particular setup must be duplicated to insure repetitive positioning. This is due, of course, to the fact that if any rotation of the adapter relative to its driver is experienced, the angular offset of the true axis of the adapter relative to the spindle's rotational axis would change, and, consequently, the arc transcribed by the tool cutting surface would change. Therefore, a radial locator means for the adapter is necessary to prevent this change.

Additionally, it is desired that a tool adapter be readily insertable and removable from the driver so that the various machine operations previously described can take place with the maximum amount of facility. In other words, not only must there be a means provided for the repetitive positioning of the tool adapter, but desirably this must be done very quickly. Additionally, in cases where a tool adapter is cooperating with a driver, the driver is generally nonrotatable relative to the machine spindle; and, therefore, means must also be provided to drive the adapter through the driver. So in summary, it is necessary to be able to repetitively position the tool, drive the tool, and to accomplish the repetitive positioning very quickly.

The prior art has typically provided either very complex mechanisms for bringing about a repetitively positionable tool with this quick change capability or simpler devices lacking either repetitive positioning or quick operation. For example, the prior art teaches collet, chuck, and mandrel arrangements to carry out the aforementioned functions which involve the accurate machining of several pieces to very fine dimensions in an attempt to make tool insertion and withdrawal repetitively accurate. This, naturally, involves great cost, and it is inevitable that a stackup of dimension occurs between the various pieces of the assembly that merely compounds the problem and makes such an assembly very expensive. Additionally, some prior art devices utilize pins for locators and drive means, extending both axially and laterally of an adapter to be held, but they have disadvantages. For example, if these devices used fixed pins for drive means acting on the rear of an adapter, the pins were centered and, therefore, no locating. If these devices use laterally extending offset pins for driving and locating, the pin has to be removed to insert the adapter defeating the quick change capability. This is due to the fact that the pins coact with the sides of an adapter shank rather than the rear thereof.

The prior art has also attempted to solve the problems of the quick-change adapter, previously herein set forth, by providing a complicated driver assembly and an intricately machined adapter assembly that is insertable into the driver in only one rotative position. In this case, additional means must be provided for holding the adapter so inserted for operation of the apparatus as well as still other means being provided for driving the adapter relative to the driver. This is usually accomplished with an intermediate member which has means cooperating to give the assembly the repetitive positioning capability it requires and has other means which cooperate with the driver to provide a drive therebetween. Again, this necessarily involves the very accurate machining of at least one extra member and requires means to hold that member operatively positioned during operation of the apparatus. Typical means for accomplishing this is by providing an adjustable collet which requires the machining of that extra element. In summary, the prior art mechanisms carry out the desired function but are only capable of accomplishing this at the expense of very intricate machining which necessarily increases the cost of the apparatus or present devices that are difficult and time consuming to manipulate.

The subject invention contemplates the solutions to the aforementioned problems of the prior art by providing an uncomplicated quick-change tool assembly comprising driver means that are adapted to be carried by a rotary machine spindle, the driver means having a longitudinally extending bore therein and an element extending across the bore which is offset with respect to the longitudinal axis thereof. An adapter means is designed to be inserted into the bore and carries a cutting surface or surfaces. The shank of the adapter means has a surface that cooperates with a portion complementary in shape to part of the outer surface of the element carried by the driver means and is engageable therewith to provide a radial locator and drive means for the adapter means relative to the driver means. This structure allows a repetitive repositioning of the adapter means relative to the driver means. To hold the driver means and adapter means in engagement, an aperture is provided in a wall of the driver means that is angularly disposed with respect to the longitudinal axis of the bore and communicates with the bore. A screw member having a ball nose extremity passes through the aperture and engages a scalloped portion of the shank of the adapter means. The scalloped portion is engaged by the ball nose extremity so that the driver and adapter means are maintained in fixed relationship when the complementary shaped portion of the shank is in mating engagement with the element extending across the bore. Therefore, in contradistinction to the repetitive positioning apparatus shown in the prior art, the present invention requires precision machining only in locating a simple shaped depression on the rear of an adapter relative to an element extending across the bore of a driver.

Accordingly, it is an object of the present invention to provide an improved quick-change tool assembly wherein the driver means is adapted to be carried by a rotary machine spindle and has a longitudinally extending bore therein with an element extending across the bore that is offset with respect to the longitudinal axis thereof, and adapter means adapted to carry a cutting element having a shank portion insertable into the bore, the shank portion having a surface at one extremity thereof through which the longitudinal axis of the shank passes, the portion being complementary in shape to a portion of the outer surface of the element and being engageable therewith to provide a radial locator and drive means for the adapter means relative to the driver means.

It is another object of the present invention to provide a quick-change tool assembly in accordance with the foregoing object wherein the surface of the adapter means has a depression with the deepest portion thereof offset from the longitudinal axis of the bore an amount equal to the amount of the offset of the longitudinal axis of the element.

It is still another object of the present invention to provide an improved tool assembly in accordance with the foregoing objects wherein the driver means has an aperture in a wall thereof angularly disposed with respect to the longitudinal axis of the bore and communicates with the bore, the aperture carrying a screw means with a ball nose extremity that is adapted to cooperate with a scalloped portion of the shank portion thereby maintaining the driver and adapter means in fixed relationship.

It is a further object of the present invention to provide an improved driver comprising a body having a tapered outer portion adapted to engage a rotary machine spindle, the body having a longitudinally extending bore therein adapted to receive a shank of a cutting surface carrying element and an element carried by the body and extending across the bore transversely of the longitudinal axis of the bore and offset with respect thereto, at least one portion of the outer surface of the element extending into said bore at least an amount equal to the major outer diameter of the element.

It is still a further object of the present invention to provide an improved adapter comprising a body adapted to carry a cutting surface, the body having a shank portion with an extremity presenting a surface through which the longitudinal axis of the shank passes with a contoured portion formed on the extremity that is offset with respect to the longitudinal axis of the body.

Other objects and attendant advantages of the present invention will be readily appreciated as the same becomes better understood by reference to the following detailed description when considered in connection with the accompanying drawings wherein.

Figure 1:
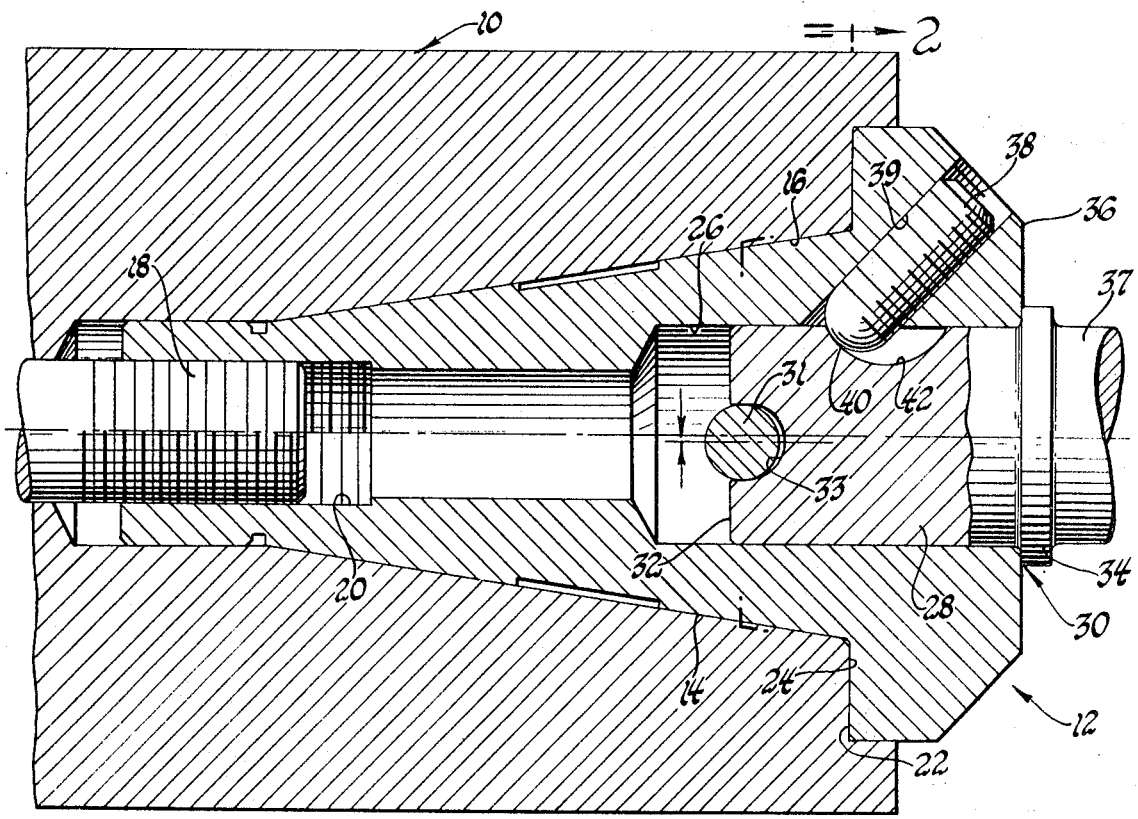
FIG. 1 is a sectional view of the subject invention shown in its operative environment.

Referring to FIG. 1, a spindle designated by numeral 10 is carried by any typical rotary machine and is adapted to rotate therewith. A driver 12 has a substantially conical axially extending outer surface 14 adapted to mate with a complementary shaped conical surface 16 of spindle 10. Threaded portion 18 of spindle 10 threadingly engages a threaded bore 20 of driver 12. When driver 12 is properly seated against spindle 10, flange 22 thereof rests in mating engagement with depression 24 of spindle 10.

Figure 2:
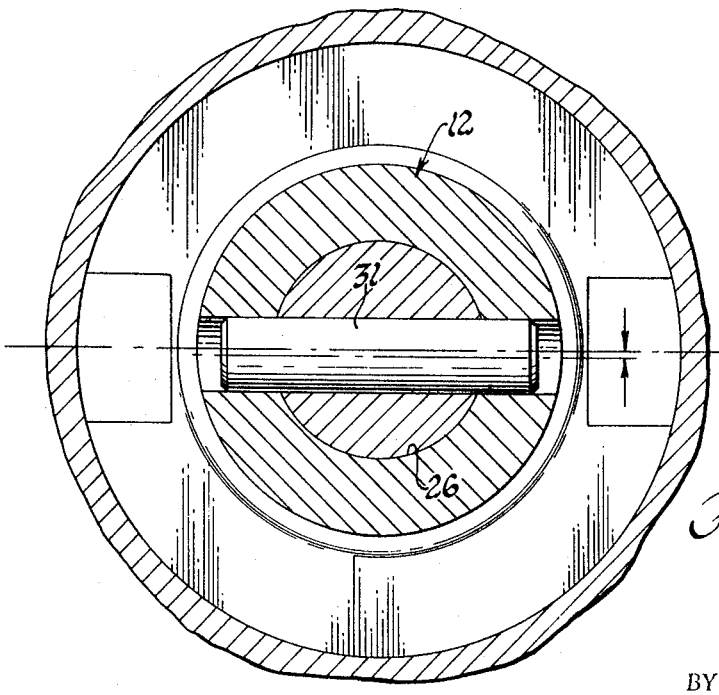
FIG. 2 is a sectional view taken along line 2–2 of FIG. 1.

Driver 12 has a longitudinally extending bore 26 therein adapted to receive shank portion 28 of adapter 30. Adapter 30 can be any well-known cutting element carrying member such as a boring bar, drill, milling cutter, etc., appropriately modified as hereinafter described. Because repetitive positioning is important, a pin type element 31 is fixed with respect to driver 12 and extends transversely through bore 26 in driver 12 and is offset with respect to the longitudinal axis of bore 26 as best seen in FIG. 2. It is therein seen that element 31 laterally extends into bore 26 enough so that a portion of the major diameter is exposed.

Shank portion 28 of adapter 30, as seen in FIG. 1, is insertable into bore 26 and has a surface 32 at one extremity thereof through which the longitudinal axis of shank 28 passes and having a portion 33 in the form of a contoured area complementary in shape to a portion of the outer surface of pin element 31. In essence, portion 33 forms a depression. In addition, the longitudinal axis of adapter 30 passes through this extremity.

The complementary shaped transversely extending depression 33 is designed to matingly receive pin element 31 with the deepest portion of depression 33 offset with respect to the longitudinal axis of bore 26 to an exactly similar degree. In this manner, adapter 30, when inserted into bore 26, will only mate with pin element 31 by way of depression 33 in one manner. In other words, if shank portion 28 of adapter 30 is inserted into aperture 26, 180° out of phase from that in which it is intended to be disposed, depression 33 will not mate with pin element 31, and it will become immediately apparent to the person inserting shank portion 28 that the shank should be rotated. Any amount of turning of shank portion 28 relative to pin element 30 of insufficient proportion to mate portion 28 with depression 33 will be immediately apparent in that flange 34 of adapter 30 will not seat against front face 36 of adapter 30. It is, therefore, clear that adapter 30 can be inserted properly in aperture 26 in only one manner due to the offset positioning of pin element 31, and this provides a radial locating means for adapter 30.

Pin element 31 serves another function in that it represents the sole driving means between driver 12 and adapter 30. Driver 12 is preferably firmly anchored in spindle 10 and is nonrotatable with respect thereto. Therefore, shank portion 28 can be of any form in a tool carrying adapter that is to be repetitively positioned in bore 26 in accordance with the present invention and can have any size cutting surface carried on portion 37.

Threaded member 38 is disposed in a threaded aperture 39 angularly disposed with respect to the longitudinal axis of bore 26 and has a ball nose end 40 that is adapted to be received in scalloped portion 42 of shank portion 28. As threaded member 38 is threaded inwardly in the direction of scalloped portion 42, a pressure is exerted against shank portion 28 of adapter 30, driving it more firmly into engagement with element 31 and locking it in place. Therefore, when depression 33 of shank portion 28 is properly positioned against element 31, threaded member 38 is threaded inwardly engaging scalloped portion 42 so that adapter 30 is then immovable with respect to driver 12. In this manner, the cooperation of depression 33 and element 31 provides a radial locator means as well as a drive means for adapter 30.

Upon examination, it is evident that adapter 30 can take any form such as a drilling or milling cutter and can be interchangeably received in aperture 26 with a guarantee that previously established radial locations of adapter 30 are duplicated in the next installation. As previously set forth, the rotative axis of adapter 30 must be duplicated in subsequent machining operations in order to guarantee that the precise size of the next machined aperture duplicates the size of the aperture previously machined. The present invention, therefore, provides a quick-change tool assembly that will inevitably duplicate the previously established axis of the aperture made by adapter 30 when it has a given rotational axis, and the size of the aperture is thereby duplicated. The only tolerances, then, that must be maintained are the tolerances of the depression 33 on the rear surface of the shank portion 28 of adapter 30. This represents a minimum amount of machining and layout work which necessarily reduces the cost of providing an interchangeable setup such as herein disclosed. As opposed to the assemblies shown in the prior art, no involved mechanism is necessary, no extensive machining is needed, and there can be no uncontrollable stackup of dimensions when the only dimension of criticality is the position in the rear of shank portion 28 of adapter 30 for depression 33. In this manner, a quick change tool assembly has been provided that obviates all the problems of the prior art while being relatively simple to manufacture.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A quick-change tool assembly, said assembly comprising: driver means adapted to be carried by a rotary machine spindle, said driver means having a longitudinally extending bore therein and a locator and drive element extending transversely across said bore and being laterally offset with respect to the longitudinal axis thereof; and an adapter means adapted to carry a cutting element and having a shank including a shank portion insertable into said bore, said shank portion having a surface at one extremity thereof through which the longitudinal axis of said shank passes, said surface having a portion complementary in shape to a portion of the outer surface of said element and being engageable therewith to provide predetermined rotary location and drive for said adapter means from and relative to said driver means thereby allowing repetitive positioning of said adapter means relative to said driver means.

2. A quick-change tool assembly according to claim 1 wherein said element is a pin that is fixed with respect to said driver means.

3. A quick-change tool assembly according to claim 1 wherein said driver means has a tapered outer portion adapting its engagement directly with a rotary spindle.

4. A quick-change tool assembly according to claim 1 wherein said surface of said adapter means includes a depression having a deepest portion offset from the longitudinal axis of said bore an amount substantially equal to the amount of offset of the longitudinal axis of said element.

5. A quick-change tool assembly according to claim 1 wherein said driver means has an aperture in a wall thereof angularly disposed with respect to the longitudinal axis of said bore and communicating with said bore, said aperture carrying a screw means with a ball nose extremity, said adapter means having a scalloped portion on said shank portion adapted to be engaged by said ball nose extremity to maintain said driver means and adapter means in fixed relationship.

6. A quick-change tool assembly according to claim 1 wherein said driver means includes a body having a front face and said adapter means includes a flange with a rear surface engageable with said front face of said body as said portion of said surface at the extremity of said shank of said adapter means engages said element.